March 6, 1962 J. H. MILLAR 3,023,496
METHOD OF WELDING FLEXIBLE METAL PIPE
UNITS AND END FITTINGS WITHOUT THE
Filed Sept. 5, 1958 ADDITION OF WELD MATERIAL
3 Sheets-Sheet 1

Inventor
John Humphrey Millar
By Lucke & Lucke
Attorney

March 6, 1962

J. H. MILLAR 3,023,496

METHOD OF WELDING FLEXIBLE METAL PIPE
UNITS AND END FITTINGS WITHOUT THE
ADDITION OF WELD MATERIAL

Filed Sept. 5, 1958

Inventor
John Humphrey Millar
By Lucke & Lucke
Attorney

March 6, 1962

J. H. MILLAR 3,023,496

METHOD OF WELDING FLEXIBLE METAL PIPE
UNITS AND END FITTINGS WITHOUT THE
ADDITION OF WELD MATERIAL

Filed Sept. 5, 1958

Inventor
John Humphrey Millar
By Fucke & Fucke
Attorney

United States Patent Office 3,023,496
Patented Mar. 6, 1962

3,023,496
METHOD OF WELDING FLEXIBLE METAL PIPE UNITS AND END FITTINGS WITHOUT THE ADDITION OF WELD MATERIAL
John Humphrey Millar, Newport, R.I., assignor to Engineering Developments, Inc., a corporation of Delaware
Filed Sept. 5, 1958, Ser. No. 759,317
4 Claims. (Cl. 29—470.5)

This invention concerns flexible metal pipe units and end fittings, e.g. coupling elements of the like (all hereinafter called end fittings), therefore, such units being of the kind comprising a flexible metal tube of the so-called corrugated or concertina wall type usually, but not invariably, enclosed in at least one flexible metal reinforcing layer such as a braided metal wire reinforcement of tubular form.

When the tube of such a pipe unit is enclosed by one or more tubular reinforcing layers the or each such layer serves to transmit tensile stresses from one end to the other of the pipe unit and also to support the metal tube against outwards radial thrust under the influence of internal fluid pressure within the tube, the ends of such reinforcing layer being attached to the end fittings of the unit and such end fittings being adapted to be connected to other pipe units or to other fittings. Moreover, the or each such layer also serves to damp out vibrations or resonance arising in the corrugated metal tube under the influence of pulsating internal pressure or mechanically induced vibration.

The invention may be applied to pipe units of which the tube is of the bellows type in which the corrugations are purely annular and at right angles to the tube axis, or it may be applied to units in which the tube has its corrugations helically arranged in screw-thread fashion about the tube. The tube may be formed, for example, by suitably profiling seamless tube or it may be formed from sheet metal rolled and then butt welded by means of an argon-shielded arc, or it may be formed from metal strip rolled or otherwise formed to the appropriate cross-section, the strip being wound into a helix and finally having the adjoining edges of adjacent convolutions of such helix butt welded, seam welded or otherwise secured together in a fluid-tight manner.

One known form of corrugated metal pipe unit having end fittings of a simple, light-weight, and relatively inexpensive form consists of a length of corrugated metal tube surrounded by a braided wire reinforcement and having each end of the length of tube and of the reinforcement inserted together into an annular cup or groove provided in the enlarged rear end of the end fitting, the tube and the reinforcement being secured in such annular cup or groove by means of solder or silver brazing alloy; this alloy has conveniently been one having a melting range of 608° to 617° C.

This particular manner of connecting the corrugated metal tube and its braiding reinforcement to end fittings limits the resistance of the unit to corrosive liquids and gases which cause the solder or brazing material to deteriorate with loss of fluid-tightness after a certain service period. Moreover, the resistance of the unit to high temperatures is limited and for this reason such units are not suitable for use in many applications and particularly in certain aircraft installations in which the units have to have a high standard of fire resistance. Thus for certain aircraft installations the pipe units have to be capable of withstanding a 1000° C. fire test for 15 minutes under simulated service conditions of internal pressure and vibration but without liquid passing through the units to cool them, to ensure that the units will not fail in the event of outbreak of fire in the aircraft.

It will be appreciated that pipe units of the kind with which this invention is concerned may be used in aircraft installations for conveying fuel, lubricants, cooling fluids, air or other gases, or products of combustion and that should such a pipe unit fail on the outbreak of fire this failure may serve to feed combustible or combustion-supporting fluid to the fire thereby to increase the damage resulting from the fire or to render difficult or impossible the task of extinguishing the fire. It will be understood that in the case of a unit conveying air, not only will failure of such unit on the outbreak of fire feed the latter with combustion-supporting fluid but that the air will also dilute any fire-extinguishing medium employed to extinguish the fire, so rendering such medium less effective.

With a pipe unit of the known form described above, an intense flame acting thereon rapidly raises the temperature of one or both end fittings and if there is no or insufficient fluid circulating through the unit to act as a cooling agent to dissipate the heat, the soldering or brazing material soon reaches its melting point with consequent failure of the unit as a result of internal pressure pulling the tube away from the or each end fitting.

The object of the present invention is to provide a pipe unit of the aforesaid kind which is capable of withstanding the fire test mentioned above and which is also simple to fabricate and light in weight. Further objects of the invention are to provide pipe units which employ no non-metallic sealing material in the joint between the metal tube and its end fiittings and which is capable of conveying not only fuels and lubricants and air or other relatively inert gases, but also liquids and gases of a corrosive nature.

Thus a specific object of the invention is to provide a pipe unit of the aforesaid kind having end fittings each comprising a tubular spigot extending into its respective end of the corrugated metal tube, the terminal corrugations of which are compressed to form an annular block having a substantially flat annular end face, a ferrule embracing the tube and any reinforcing layer therearound and extending from about the said block end face to at least the end of the block remote from such end face, said ferrule being welded to the spigot, to any reinforcement and to the end face of the block formed by the compressed tube corrugations.

Preferably the said spigot extends into the tube at least as far as the end of the block of compressed corrugations remote from the flat end face of such block.

The spigot and ferrule are of course made of metal capable of withstanding the test and service conditions and usually will both be formed of stainless steel as will also the metal tube and any reinforcement.

Preferably, one or more uncompressed corrugations adjacent to said block may be supported by extensions of the spigot and ferrule within and externally of, respectively, such corrugations, the extension of the ferrule being partially swaged to eliminate clearance between its internal surface and the tube corrugations to be supported, or between such surface, any reinforcement and the said tube corrugations.

In a pipe unit incorporating this latter feature, movement of the corrugated metal tube relatively to the end fittings and under the influence of vibration or flexing the unit or as a result of fluctuations of fluid pressure within the tube, takes place in the regions of the unsupported tube corrugations nearest to the end fittings and these regions are spaced from the points at which welding has been effected, and any deterioration of the tube metal as a result of welding has taken place, by the axial extent of said supported corrugations. Thus the heat applied to the extremity of the tube during welding of the ferrule and spigot to each other and to the end face of the said block, and to any reinforcement, does not affect the mechanical properties of the tube in the region thereof at which the major stresses arise in service.

While such spigot and ferrule extensions support one or more tubular corrugations adjacent to said block against transverse movement relatively to the spigot axis, but permit some axial movement of the supported corrugations, it will be understood that any such axial movement is restricted by friction between the ferrule extension and the corrugations, or between any reinforcement and such corrugations, so that destructive relatively high-frequency axial vibration of such corrugations will be substantially precluded by the "damping" effect of such friction.

However, in accordance with a further feature of this invention, one or more uncompressed tube corrugations adjacent to said block may be positively supported against axial displacement relatively to the spigot. Thus, if desired, a sleeve or "gripper" having an internal configuration complementary to the external form of the uncompressed corrugations of the tube may be disposed over the uncompressed tube corrugations which are to be supported.

Another specific object of the invention is to provide a pipe unit of the aforesaid kind having end fittings each comprising a tubular spigot extending into its respective end of the corrugated metal tube, the terminal corrugations of which are compressed to form an annular block having a flat annular end face, a gripper having an internal configuration complementary with the external form of the uncompressed tube corrugations and embracing one or more uncompressed tube corrugations adjacent to said block, and a ferrule embracing said block, any reinforcement, and said gripper and being welded to the spigot, to any reinforcement and to the flat end face of the block of compressed corrugations, said ferrule extending from about said block end face at least over the gripper, and trapping any reinforcement between itself and the said gripper.

In this latter form of the invention the said gripper preferably has an annular extension which surrounds the block constituted by the compressed corrugations of the metal tube and presents an end face by which it can be welded to the spigot, to the ferrule, to any reinforcement, and to the block end face.

It will be understood that when the metal tube is helically corrugated the said gripper will have an internal screw-thread-like form complementary with the external form of the tube corrugations to be supported by the gripper so that a one-piece gripper may be employed if this is "screwed" over the exterior of the tube end prior to compression of the terminal corrugations to form said block. However, in the case of bellows-type, or annularly corrugated, tube, the gripper will have to be formed in two or more part-annular portions to enable it to be assembled around the tube corrugations which it is to support. Such a "split" gripper would also be employed in the event that it were desired to fit the gripper in its corrugation-supporting position subsequent to compression of the terminal corrugations of the tube to form said block.

If the tube is provided with an external tubular reinforcement, the outer surface of the gripper may be serrated or otherwise roughened to grip such reinforcement securely between the gripper and the ferrule, thereby to diffuse axial loads on the reinforcement over a considerable area of the end fitting parts co-operating with the reinforcement and to eliminate high loads on the welded portion of the reinforcement.

The welding operation by which the end fitting parts are attached to the metal tube and its reinforcement is preferably carried out by shielded-arc welding process, e.g. with an argon-shielded arc, and preferably the additional metal which is used to form the weld is derived from a metal annulus which is abutted against the flat end face of the block formed by the compressed corrugations during the assembly of the fitting on the tube end. In this way the amount of welding metal employed additional to that produced by fusion of the end fitting parts and of said block end face during the welding operation can be predetermined and not left to the discretion of the operator. The said annulus may be separate from any of the other parts of the fitting prior to the welding operation or it may, if desired, be constituted by an appropriately located flange on either the spigot or the ferrule, or upon the gripper when a "split" form of the latter is employed.

At least two terminal corrugations, and preferably about five, six or more terminal corrugations of the metal tube are axially compressed to form said block.

Moreover, preferably at least two uncompressed tube corrugations adjacent to the block are supported against movement relatively to the spigot.

When a gripper is employed the said ferrule may be swaged down to trap any reinforcement between the ferrule and the gripper without risk of distorting the underlying tube corrugations. When, however, no gripper is employed and the ferrule and spigot have extensions as above described, the swaging of the ferrule extensions to remove clearances between the ferrule, any reinforcement and the tube should not be carried to such an extent that the tube corrugations would be deformed, as this would weaken the tube.

When the ferrule is provided with an extension as above described, or when a gripper is employed and the ferrule extends beyond that end of the gripper remote from the block of compressed tube corrugations, the extremity of the ferrule or its extension is preferably belled out and smoothly radiused to ensure a smooth lead out for the tube (and any reinforcement) from the end fitting, thereby to reduce stress concentrations in this region of the tube.

That portion of the spigot which extends out of the corrugated metal tube may of course be formed in any desired manner to adapt it for connection to other conduit parts or fittings; it may be rectilinear in form or it may include an angle or bend.

A further specific object of the invention is to provide an end fitting for a flexible corrugated metal tube, such end fitting comprising a tubular spigot adapted to enter an end of such metal tube, a ferrule adapted to embrace such tube end and any external metallic reinforcement thereof, said ferrule and spigot being adapted to be welded one to the other and to the flat end face of a block of axially compressed corrugations formed at the tube end, and to any reinforcement, with the ferrule extending over the tube and any reinforcement from about the end face of the block to at least the end of the block remote from such end face.

Yet another specific object of the invention is to provide an end fitting for a flexible corrugated metal tube, such end fitting comprising a tubular spigot adapted to enter an end of such metal tube, a tubular gripper having an internal configuration complementary to the external form of uncompressed tube corrugations and adapted to embrace one or more such corrugations adjacent to a block of axially compressed corrugations formed at the tube end, with any reinforcement extending over the gripper, and a ferrule adapted to embrace said block and said gripper, and any reinforcement overlying the gripper, the ferrule and spigot being adapted to be welded one to the other and to the flat end face of said block, and to any reinforcement. When, as will usually be the case, the tube to which the end fitting is to be applied is enclosed by a tubular reinforcement, the ferrule will additionally be adapted to be swaged to trap the reinforcement between itself and the gripper.

A still further specific object of the invention is to provide a method of fabricating pipe units of the aforesaid kind, such method comprising axially compressing terminal corrugations of a length of corrugated metal tube to form an annular block having a flat annular end face, applying a tubular ferrule over said block and any metallic reinforcement of the tube so that such ferrule extends from about the flat end face of said block over one or more uncompressed corrugations adjacent to the block, introducing a tubular spigot into such block, and welding said ferrule to said spigot and to the flat end face of said block and to any reinforcement to unite the block fluid-tightly to the spigot.

If the end fitting is to include a gripper of the form described herein, then the above method will further include the step of applying the gripper to the tube end prior to compressing the terminal corrugations. If the tube has a tubular metallic reinforcement, the method will include the further step of swaging the ferrule on to the gripper to trap the reinforcement between the ferrule and the gripper, such swaging preferably being effected prior to introducing the spigot into the block of compressed corrugations.

In order that the invention may be thoroughly understood, the fabrication of some embodiments of the pipe unit in accordance with the invention will now be described by way of example and with reference to the accompanying drawings, in which.

Figure 1:
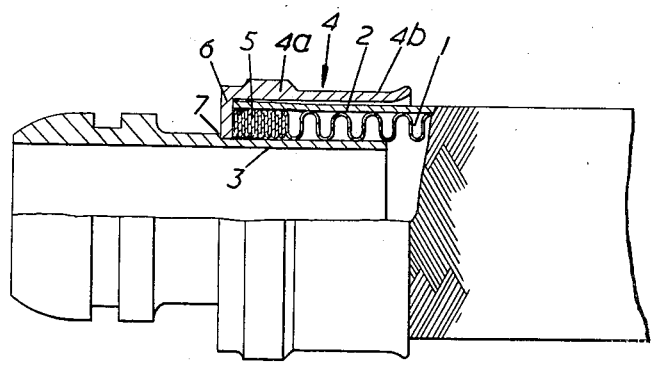
FIGURE 1 is a part sectional view of one end of a pipe unit in accordance with the invention, showing the end fitting parts in position but prior to the welding step which unites the parts together and to the tube end.
Figure 2:
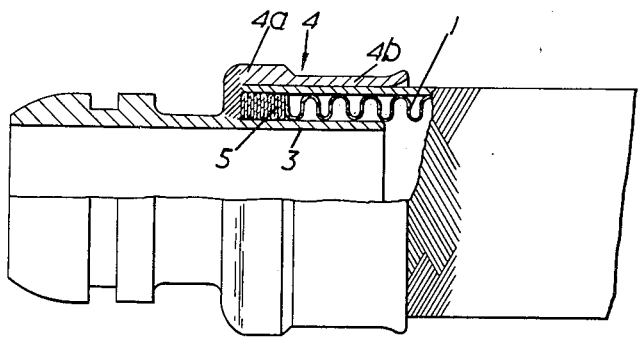
FIGURE 2 is a view corresponding to FIGURE 1 but showing the finished pipe unit end after welding and after swaging of the ferrule.
Figure 3:
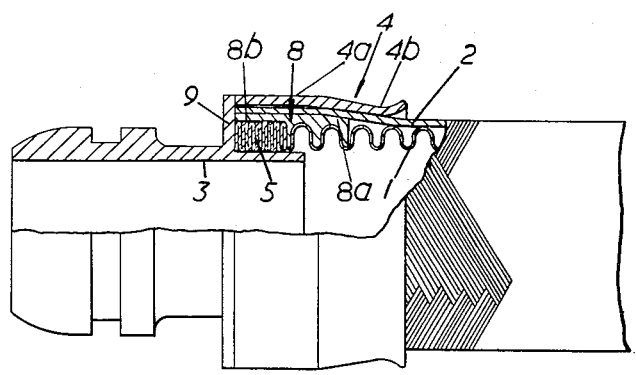
Figure 4:
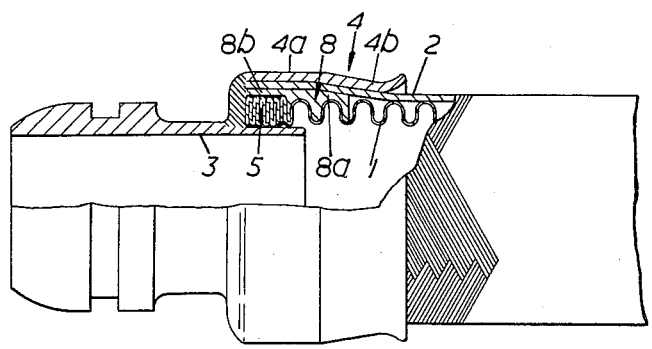
Figure 5:
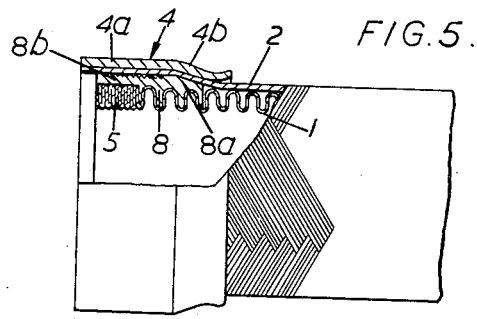
Figure 6:
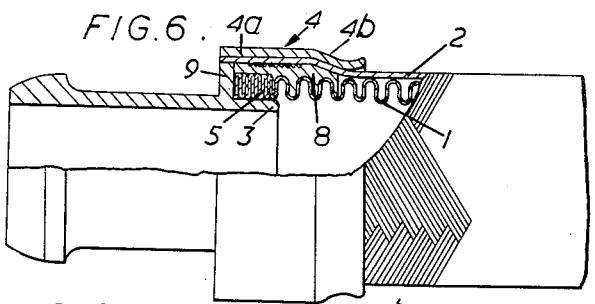
Figure 7:
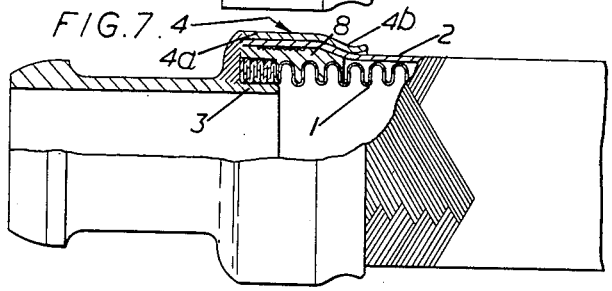
Figure 8:
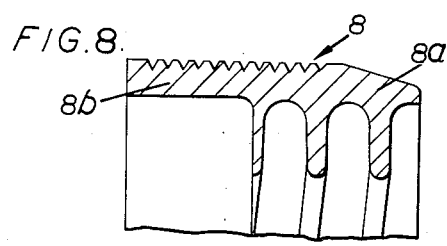

FIGURES 3 and 4 correspond respectively with FIGURES 1 and 2 and show one end of a second embodiment of a pipe unit in accordance with the invention;

FIGURE 5 is a part-sectional view of one end of a modification of the pipe unit of FIGURES 3 and 4, showing a first stage in the assembly of an end fitting on such unit;

FIGURES 6 and 7 show intermediate and final stages in the assembly of such end fitting on the unit; and FIGURE 8 is an enlarged fragmentary view, in axial section of the gripper of the end fitting of the modification of FIGURES 5 to 7.

In the first embodiment of a pipe unit in accordance with this invention, one end of which is shown in FIGURES 1 and 2, the unit comprises a length of helically corrugated flexible stainless steel tube 1 with a wall thickness of, for example, 0.005–0.006 inch and a nominal clear bore of five eighths of an inch, this being enclosed by a single sheath of tubular braid 2 of stainless steel wires of, for example, 0.0124 inch diameter. Each end of said tube is equipped with an end fitting comprising a tubular spigot 3 and a ferrule 4, both formed of stainless steel.

In fabricating such unit, the terminal corrugations of each of the tube, for example six corrugations at each end, are compressed to form an annular block 5 having a flat annular end face. Thereafter, a ferrule 4, which in this embodiment has a bore substantially equal to the overall diameter of the tube 1 and sheath of braid 2 and includes a thickened main portion 4a of axial depth approximating to the axial depth of the block 5, and inwardly-directed flange 6 at one end of the main portion 4a and having a radial depth equivalent to that of the block end face plus the braid thickness, and an extension 4b at the other end of said main portion 4a with an axial depth corresponding to that of about four uncompressed tube corrugations, is applied to each end of the tube and over the braid reinforcement sheet 2 until the flange 6 on each ferrule abuts against the end face of the block 5 and against the end of the braid 2 at its end of the tube 1.

Next a spigot 3 is introduced into each end of the tube 1 and through the block 5 at such end. Each spigot 3 has an external diameter matching the bore diameter of the tube 1 with an annular shoulder 7 positioned to abut the ferrule flange 6 when the spigot has been introduced into and through the block 5 to extend within about four of the uncompressed corrugations adjacent to the block 5 and which are surrounded by the ferrule extension 4b. This stage in the assembly of one end of the pipe unit is illustrated in FIGURE 1.

Heat, conveniently in the form of an argon-shielded arc, is next applied to each ferrule flange 6 to fuse such flange and cause welding of the main portion 4a of the ferrule 4 to said end face of the block 5 and to the spigot 3 in the region of the shoulder 7 thereon, and also to the end of the braid reinforcement 2. Conveniently this welding operation is carried out with the aid of a jig which supports each ferrule in turn and rotates it about its axis to move its flange under the radial electrode.

Finally, each ferrule extension 4b is lightly swaged to eliminate clearance between its internal surface and the underlying reinforcement, and between the latter and the underlying uncompressed tube corrugations. FIGURE 2 illustrates the final form of the one end of the pipe unit, after the welding and swaging operations.

In a second embodiment of a pipe unit in accordance with this invention, illustrated in FIGURES 3 and 4, the unit comprises a stainless steel helically corrugated tube 1 and a stainless steel braid reinforcement 2 having dimensions as quoted above. The unit differs, however, in the form of the end fittings which each include a stainless steel gripper 8 as well as a spigot 3 and a ferrule 4 of stainless steel.

The second form of pipe unit is fabricated in the following manner:

(a) A ferrule 4 is slipped over each end of the reinforcement 2 of the tube 1. This ferrule comprises a substantially cylindrical main portion 4a and an extension 4b which converges to an internal diameter equivalent to the overall diameter of the reinforced tube. The extension 4b has an axial depth equivalent to about four uncompressed tube corrugations.

(b) A gripper 8 is applied to each tube end between the tube 1 and its reinforcement 2. This gripper is preferably externally serrated or otherwise roughened and comprises an externally frusto-conical portion 8a complementary to the wider bore half of the ferrule extension 4b and internally complementary to the external form of about two tube corrugations, and a cylindrical extension 8b having an internal diameter slightly exceeding the tube external diameter. This gripper 8 is screwed over its end of the tube until about six terminal tube corrugations are embraced by and project from the bore of the gripper extension 8b.

(c) The braid 2 is then positioned over each gripper extension 8b and the ferrule 4 is drawn back over the braid 2 at each end of the tube so that such braid is trapped between the complementary surfaces of the gripper 8 and the ferrule, the braid and ferrule ends being brought into alignment with the end face of the block 5.

(d) The projecting corrugations are axially compressed to form an annular block 5 filling and surrounded by the gripper extension 8b with a flat annular end face flush with the end of the gripper extension 8b.

(e) A spigot 3 is introduced into each tube end, each spigot 3 having a flange 9 which abuts against the end face of the block 5, the end of the gripper extension 8b and the ends of the braid 2 and ferrule 4 when the spigot has been introduced to extend to a point just beyond the said block 5. FIGURE 3 illustrates the assembly of one end of the pipe unit at this stage.

(f) The flange 9 is fused to weld the spigot 3 to the block end face, to the gripper extension 8b to the braid 2 and to the ferrule 4, conveniently in the manner described above, with an argon-shielded arc. FIGURE 4 illustrates the final form of one end of the pipe unit.

If desired, the ferrule extension 4b may be swaged firmly to anchor the braid reinforcement between itself and the gripper 8.

In a modification of the above embodiment, illustrated in FIGURES 5 to 8, the spigot 3 is provided with a flange 9 which has a radial extent such that it abuts only the end faces of the block 5 and the gripper extension 8b while the braid end and the ferrule end project over the spigot flange 9 to be fused during the welding operation. Such modification avoids the necessity for bringing the ends of the braid 2 and ferrule 4 into substantially the same plane as the end face of block 5 and the end face of the gripper extension 8b.

FIGURES 5 to 7 show stages in the assembly of an end fitting on the modified pipe unit and it will be noted that in this case the ferrule 4 and gripper 8 are first applied to the tube end, the corrugations of the tube 1 projecting from the end of the gripper extension 8b then being axially compressed to form the block 5 with a flat end face substantially flush with the end of the gripper extension 8b. Thereafter the ferrule is swaged to trap the braid 2 between itself and the gripper. FIGURE 5 illustrates the assembly at this stage.

Thereafter, the spigot 3 is introduced into the end of the tube 1 until the flange 9 abuts the end faces of the block 5 and of the gripper extension 8b (as shown in FIGURE 6), whereafter fusion of the flange 9 welds the spigot 3, block 5, gripper extension 8b, braid 2 and ferrule 4 together.

FIGURE 8 illustrates a preferred form for the gripper 8 of the embodiments of FIGURES 3 to 8. Thus such gripper is externally substantially cylindrical over most of its length and is provided with a series of serrations over this cylindrical portion to grip, when the ferrule is swaged, the braid 2 securely over a substantial area remote from the weld zone, thereby to diffuse axial loads on the braid into the end fitting parts over a substantially remote area where the properties of such parts are unlikely to have been affected by the welding temperature. The end portion of the gripper remote from the extension 8b is externally of frusto-conical form with a cone angle of about 30°.

For an end fitting for use with a seamless stainless steel tube of three-quarter inch clear bore diameter and conforming to B.S. T55 reinforced with a stainless steel braid of 0.0120–0.0124 inch diameter, the gripper of FIGURE 8 may conveniently be formed of stabilized stainless steel with an overall length of about 0.547 inch and a diameter of about 1.140 inches over its cylindrical portion, the latter being formed with twelve 60° V-section grooves having a depth of about 0.0156 inch at 0.030 inch centres, the centreline of the first groove being about 0.062 inch from the end of the extension 8b and such extension having a length of about 0.218 inch.

Thus the invention provides pipe units, end fittings, and a method of fabricating pipe units in which the metal tube may be very fragile without detriment to proper attachment to the end fittings. Thus, for example pipe units in accordance with this invention may have corrugated metal tubes of a wall thickness from about 0.0045 inch upwards, for example up to about 0.012 inch or even more.

I claim:

1. A method of fabricating a vibration and fire resistant pipe unit comprising providing a flexible corrugated metal tube of a specified metal, axially compressing terminal corrugations of a length of said tube to form a block with a flat radial face at one end of the tube, providing a reinforcing sheath of said specified metal and positioning the same over the tube and block, applying a tubular ferrule of said specified metal over said block to extend rearwardly from said flat face to cover at least some uncompressed tubular corrugations, introducing a tubular spigot of the same metal as said corrugated tube into said block to internally support the compressed corrugations substantially covered by said ferrule, placing a substantially flat metal annulus to control the amount of additional weld forming metal over said spigot and located adjacent said flat face of said block and the end of said sheath and the outer end of said ferrule with each of the ends of said sheath, ferrule, and the flat face of said corrugation abutting a plane parallel to one of the radial faces of said flat annulus to present a substantially continuous, uninterrupted, welding surface, and uniting said spigot, reinforced block, sheath and ferrule by fusing said annulus in a single weld without the addition of extraneous weld materials.

2. The method of claim 1 in which the ferrule is swaged into contact with the sheath.

3. The method of claim 1 in which a gripper is positioned over said corrugations with an extension over the block, said gripper having an end adjacent the plane of the flat face of said block and the sheath is positioned over said gripper.

4. The method of claim 3 in which the ferrule is swaged into contact with the sheath.

References Cited in the file of this patent

UNITED STATES PATENTS

| 2,142,357 | Jacobson | Jan. 3, 1939 |
| 2,216,468 | Farrar | Oct. 1, 1940 |
| 2,363,586 | Guarnaschelli | Nov. 28, 1944 |
| 2,405,542 | Wassell | Aug. 6, 1946 |
| 2,490,686 | Guarnaschelli | Dec. 6, 1949 |
| 2,516,631 | Jacobson | July 25, 1950 |
| 2,666,657 | Howard et al. | Jan. 19, 1954 |
| 2,678,836 | Courtot | May 18, 1954 |

FOREIGN PATENTS

| 155,301 | Australia | Feb. 19, 1954 |